United States Patent
Jiang et al.

(10) Patent No.: US 10,921,135 B2
(45) Date of Patent: Feb. 16, 2021

(54) REAL-TIME MAP GENERATION SCHEME FOR AUTONOMOUS VEHICLES BASED ON PRIOR DRIVING TRAJECTORIES

(71) Applicant: Baidu USA LLC, Sunnyvale, CA (US)

(72) Inventors: Yifei Jiang, Sunnyvale, CA (US); Liangliang Zhang, San Jose, CA (US); Dong Li, Sunnyvale, CA (US); Jiaming Tao, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 62 days.

(21) Appl. No.: 16/159,594

(22) Filed: Oct. 12, 2018

(65) Prior Publication Data

US 2020/0116497 A1 Apr. 16, 2020

(51) Int. Cl.
*G01C 21/32* (2006.01)
*G06K 9/00* (2006.01)
*G05D 1/00* (2006.01)
*G06F 16/29* (2019.01)

(52) U.S. Cl.
CPC ........... *G01C 21/32* (2013.01); *G05D 1/0088* (2013.01); *G06F 16/29* (2019.01); *G06K 9/00798* (2013.01); *G05D 2201/0213* (2013.01)

(58) Field of Classification Search
CPC ...... G01C 21/32; G06F 16/29; G05D 1/0088; G05D 2201/0213; G06K 9/00798
See application file for complete search history.

(56) References Cited

U.S. PATENT DOCUMENTS

2018/0203453 A1\* 7/2018 Hardy .................. G05D 1/0214
2019/0025819 A1\* 1/2019 Ferguson ............. G08G 1/0145

\* cited by examiner

*Primary Examiner* — Yuen Wong
(74) *Attorney, Agent, or Firm* — Womble Bond Dickinson (US) LLP

(57) ABSTRACT

In one embodiment, a real time map can be generated by an autonomous driving vehicle (ADV) based on a navigation guideline for a lane and associated lane boundaries for the lane on a particular segment of a road. When travelling in the lane on the road segment, the ADV can use the navigation guideline as a reference line and use the lane boundaries as boundaries. The navigation guideline can be derived from manual driving path data collected by a manned vehicle that has travelled multiple times on the particular segment of the road.

20 Claims, 10 Drawing Sheets

REAL-TIME MAP GENERATION SCHEME FOR AUTONOMOUS VEHICLES BASED ON PRIOR DRIVING TRAJECTORIES

TECHNICAL FIELD

Embodiments of the present disclosure relate generally to operating autonomous vehicles. More particularly, embodiments of the disclosure relate to generating real-time maps for autonomous driving vehicles based on prior driving path data and real-time sensor data collected from various vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors and high-definition maps, allowing the vehicle to travel with minimal human interaction or in some cases without any passengers.

Autonomous driving vehicles (ADV) rely on high-definition maps to navigate through real-world driving environments. However, typical high-definition (HD) maps provide restricting rather guiding information, for example lane boundaries, road boundaries, or stop signs. However, under certain circumstances, a map, let alone of an HD map may not be available for a particular road, such as rural areas, new development areas. In such a situation an autonomous driving vehicle may have difficulty to navigate. There has been a lack of efficient ways to drive an ADV under such circumstances.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
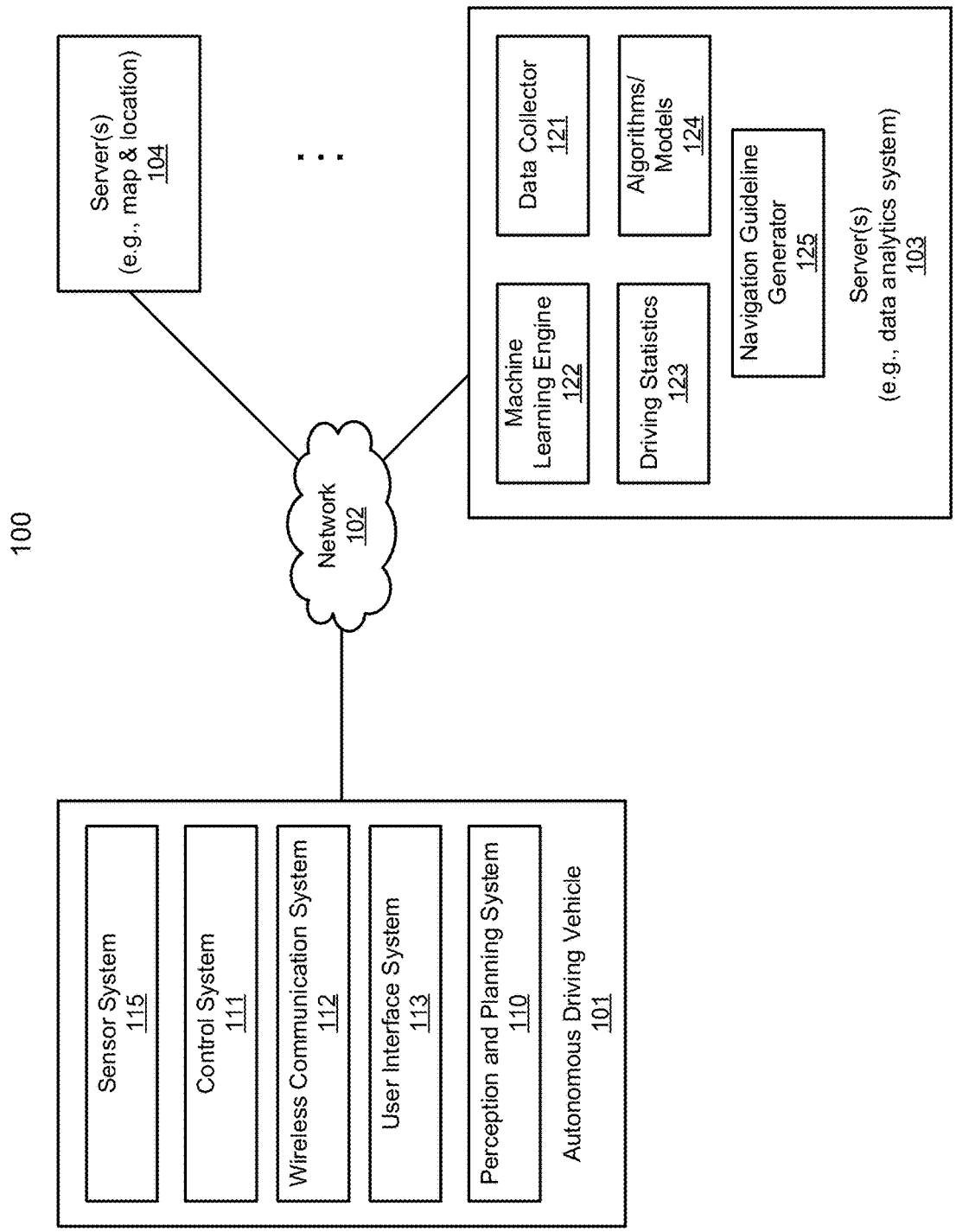
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to an embodiment, a real time map can be generated by an autonomous driving vehicle (ADV) based on a navigation guideline for a lane and/or associated lane boundaries for the lane on a particular segment of a road. The navigation guideline for a particular road and/or its associated boundary may be provided or obtained from a centralized server over a network. The navigation guideline and/or associated boundary may be determined by the server based on prior driving trajectories by a number of vehicles driving through the same road or lane. When travelling in the lane on the road segment, the ADV can use the navigation guideline as a reference line and use the lane boundaries as boundaries to determine a path to drive and control the ADV through the road or lane, without having to use a map. The navigation guideline can be derived from manual driving path data collected by a manned vehicle that has travelled multiple times on the particular segment of the road.

In an embodiment, the navigation guideline is positioned in a world coordinate system, and can be converted into body coordinates prior to generating the real-time map. The real-time map is therefore a relative map.

The real-time map is dynamically generated and can be discarded after the ADV gets off the road segment or alternatively, the map may be cached and stored in a local persistent storage for future driving on the same road/lane. Further, the real-time map only needs to show the navigation guideline and lane boundaries of a pre-determined length. As such, the real-time map can be substantially smaller than a typical high-definition map, thereby saving storage space on a server. The real-time map is also less costly to create and easier to process by other modules in the ADV.

In an embodiment, the server can derive the navigation guideline for the lane on the road segment from multiple manual driving paths in the lane. After receiving the manual driving path data, the server can clean the data by removing outliers due to aggressive driving behaviors or low quality of locations. The server can then determine dense driving areas in the lane, and apply a smooth algorithm to each dense driving area to find a smooth path within each dense driving area. The smooth paths can be utilized to derive a navigation guideline for the lane on the road segment. In one embodiment, a navigation guideline can be derived the prior trajectories of the vehicles driving through the same road or lane, for example, by taking an average position of the prior trajectories at different points in time. Furthermore, based on the driving pattern and behaviors of the vehicles derived from the prior trajectories or paths, the system may further identify and determine a number of lanes within a road or road segment, and generate a guideline for each of the identified lanes. In addition, the boundary of each lane or road, also referred to as a road width or lane width, can be derived from the navigation guideline by adding a predetermined buffer zone to both left side and right side from the navigation guideline.

ADV Architecture

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
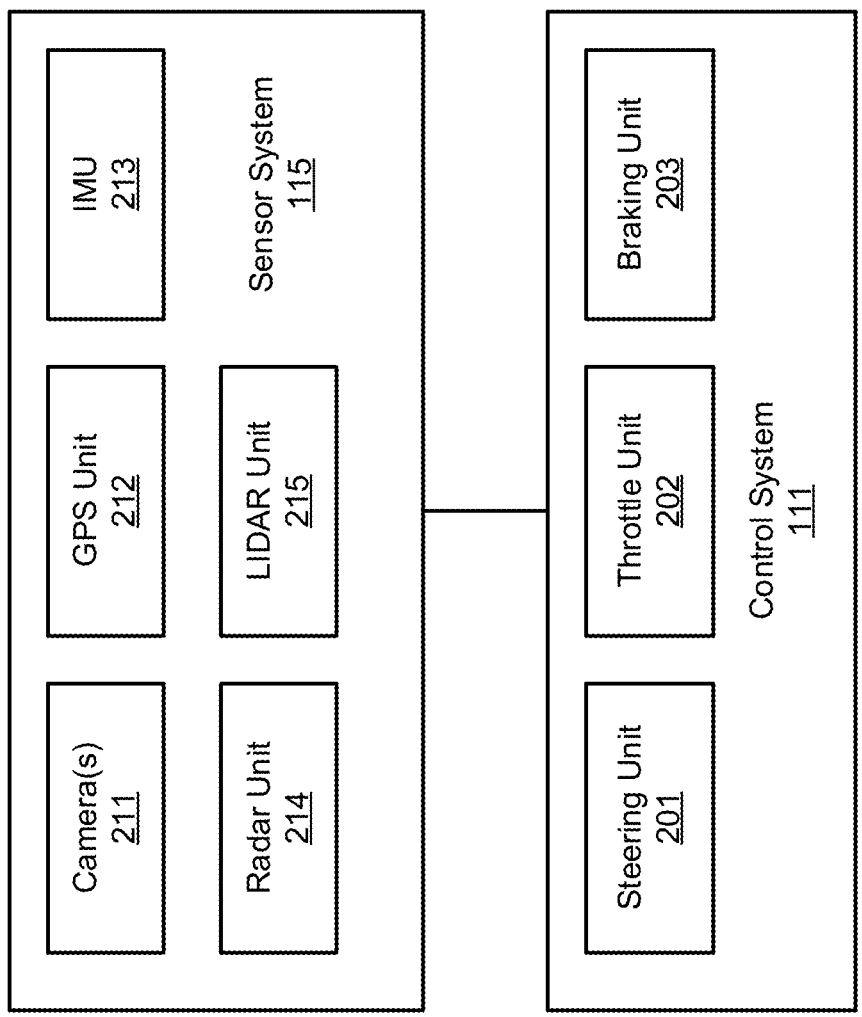
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 may include information, rules, or models to generate maps for a variety of roads based on navigation guidelines that were derived from prior trajectories of a variety of vehicles driving through the same roads, such that an ADV does not need to utilize a preconfigured map. Algorithms 124 can then be uploaded on ADVs to be utilized during autonomous driving in real-time.

The server 103 may include a navigation guideline generation module 125, which can generate one or more navigation guidelines from prior driving path data collected by a variety of vehicles while driving on a particular segment of a road. The trajectories or paths of the vehicles are recorded and captured, which may be stored as a part of driving statistics 123. Further detailed information concerning the navigation guideline generation module 125 will be described further below.

Figure 3A:
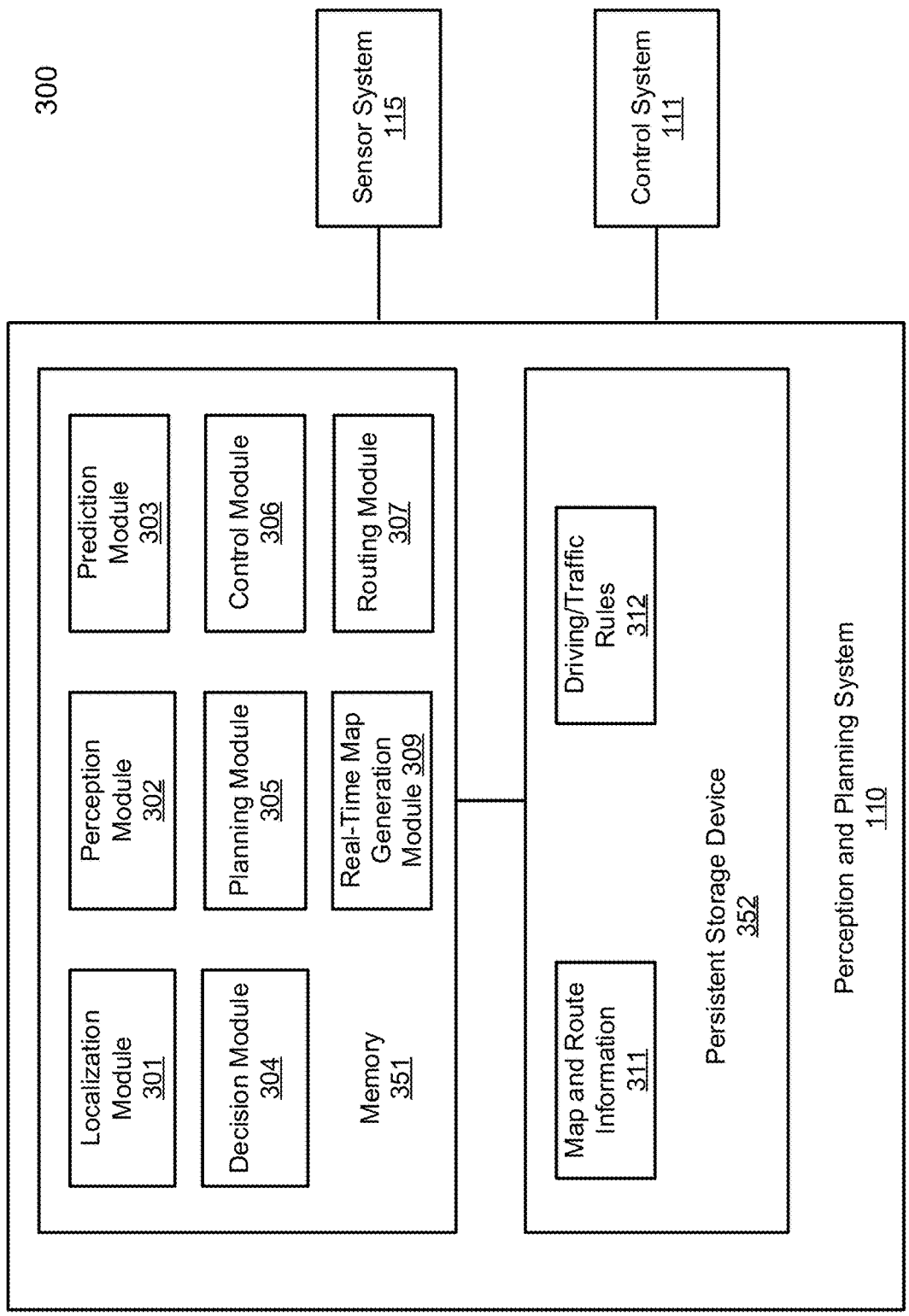
FIGS. 3A-3B are block diagrams illustrating an example of a perception and planning system used with an autonomous vehicle according to one embodiment.
Figure 3B:
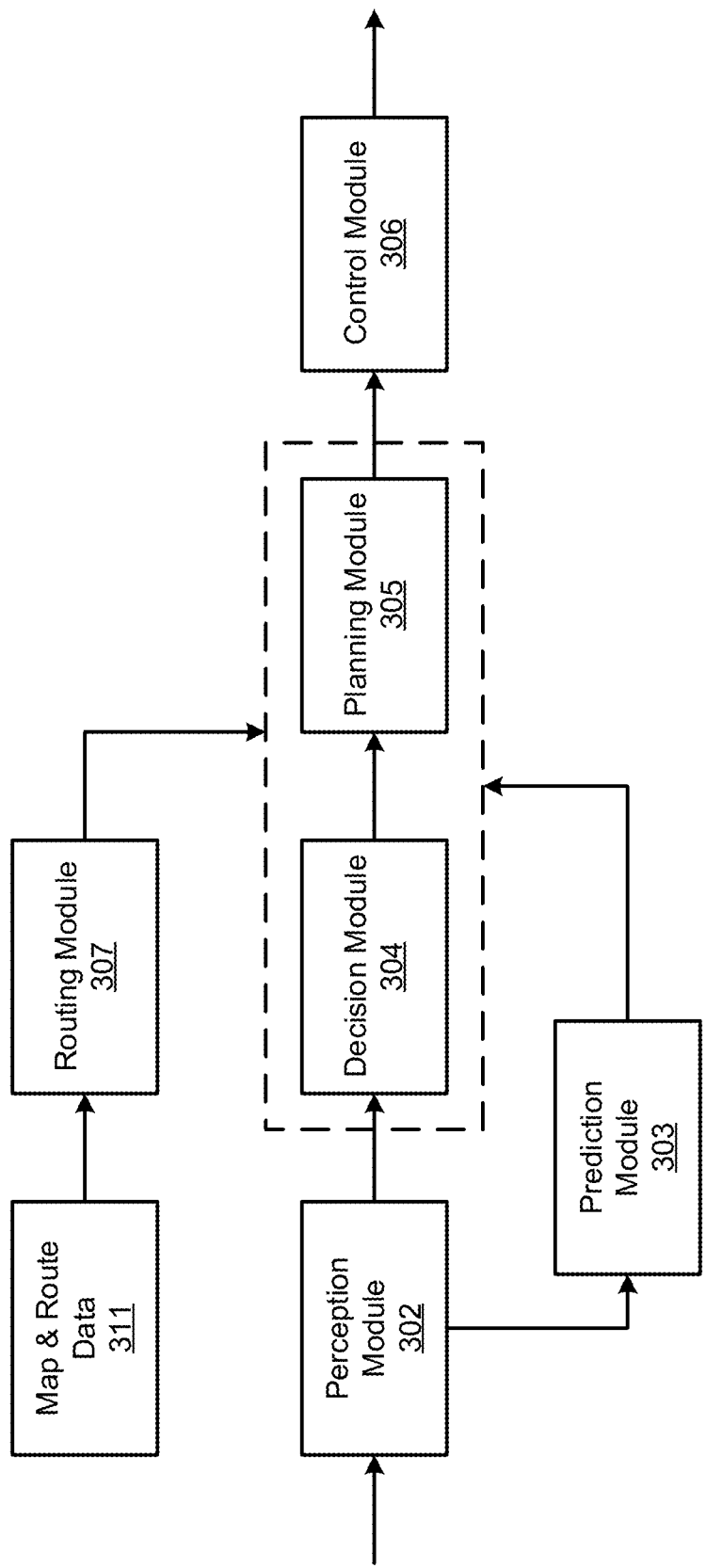

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and real-time map generation module 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Real-Time Map Generation

Figure 4:
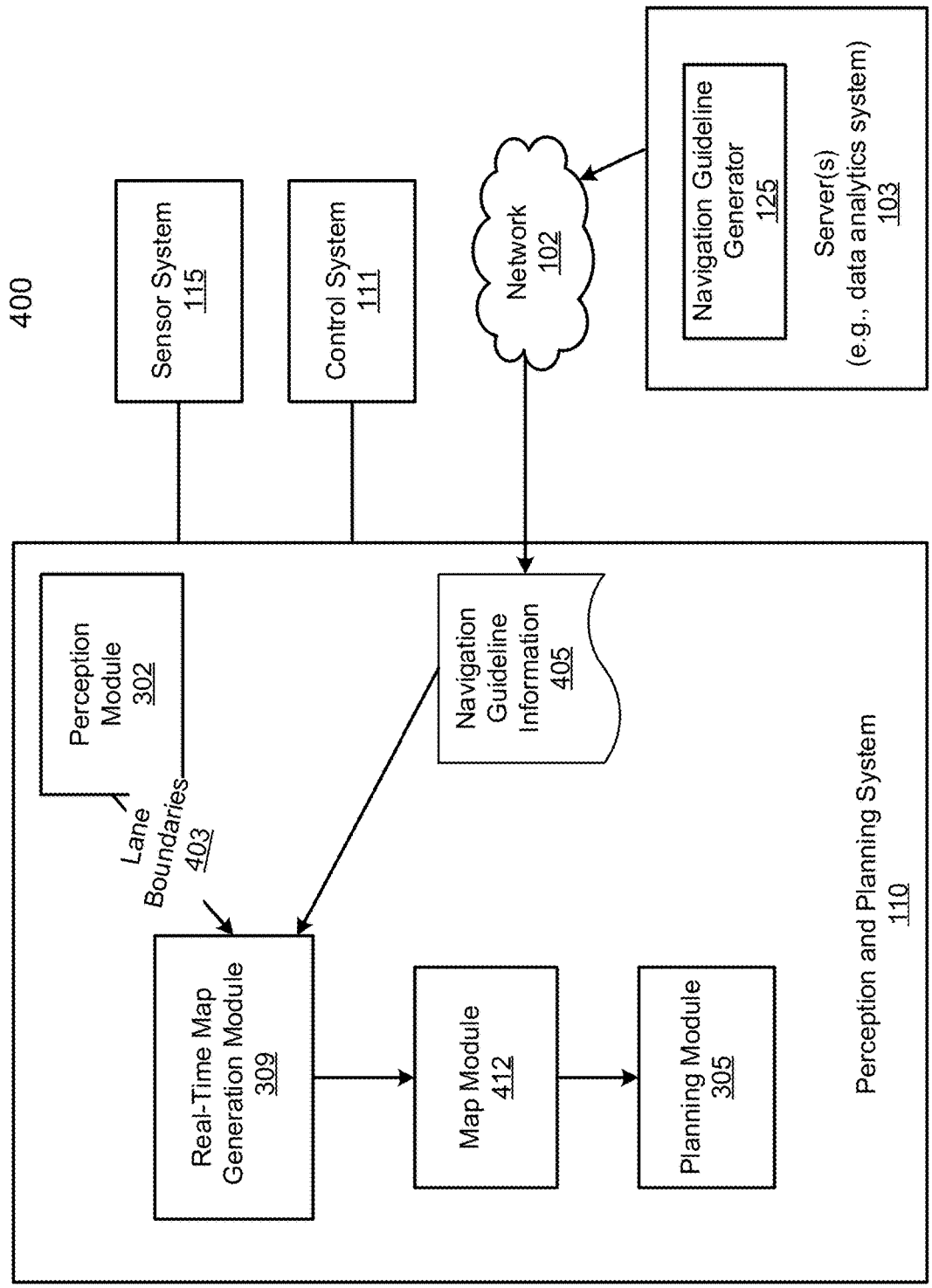
FIG. 4 illustrates a system for generating a real-time map for an ADV, in accordance with an embodiment.

FIG. 4 illustrates a system for generating a real-time map for an ADV, in accordance with an embodiment. As shown in FIG. 4, the system 400 may include the real-time map generation module 309 in the ADV 101. The map generation module 309 may be implemented as a part of localization module 301 and/or perception module 302. The ADV 101 can determine that it is to get on the segment of the road based on real time sensor data (e.g., one or more unique identifiers) or GPS coordinates. Typically, the ADV would invoke and retrieve a map segment of a map corresponding to the road such as map 311. However, in some situations, such a map is not available (e.g., new road, rural areas). Upon such a determination and the map is unavailable, the ADV 101 can send a request to the server 103, requesting data for the one or more navigation guidelines for the segment of the road. In an embodiment, the server may store prior driving path data that can be used to generate a navigation guideline for each lane on the road segment. The server may dynamically generate the guideline based on the prior driving data in response to the request or alternatively, the guideline may have previously generated and stored in a persistent storage of the server, for example, in response to a similar request from another vehicle.

Referring to FIG. 4, the real-time map generation module 309 can use navigation guideline information 405 from the server 103, lane boundaries 403 from the perception module 302, and a map module 412 to create a real-time map, for use by the planning module 305 in navigating the ADV 101.

The perception module 302 can process and analyze images captured by the sensor system 115 to identify objects and/or features in an environment of the ADV. In one example, the objects can include traffic signals, lane boundaries, and road way boundaries, pedestrians, and other vehicles. In some cases, if the lane boundary cannot be ascertained by perception module 302, the lane boundary may be derived from the guideline using a predetermined formula, for example, by adding a predetermined margin or buffer zone on both sides of the guideline based on the prior driving behaviors of the vehicles. It is assumed that the guideline is a reference line at the center of the road or lane. The lane/road width can be calculated at the ADV or at the server.

In an embodiment, the lane boundaries 403 detected by the perception module 302 can be limited to a pre-determined length. For example, only data for 10 meters of the lane boundaries in front of or behind the ADV 101 is sent to the real-time map generation module 309.

After receiving data for the lane boundaries and the navigation guideline information 405, the real-time map generation module 309 can invoke the map module 412 to generate a real-time map. As the ADV 101 moves along the road segment, the real-time map is constantly updated at a frequency (e.g., 10 HZ) used by the planning module 305 in generating trajectories for the ADV. The planning module 305 can communicate with the real-time map generation module 309 to get the updated real-time map, and use the real-time map to navigate the ADV 101.

In an embodiment, in navigating the ADV 101, the planning module 305 would closely follow the navigation guideline in the lane on the road segment. However, the planning module 305 may plan a trajectory that is different from the navigation guideline dependent upon specific driving environment at the point in time, since the navigation guideline is generated based on the assumption that the road segment is free from or with less external interferences, e.g., pedestrians and other vehicles.

In an embodiment, the real-time map generated by the map module 412 may include information about the environment or geographical location/area where the ADV may be located or travelling through. For example, the real-time map may indicate positions, locations, orientations, lengths, widths, distances, layouts, etc., of roads, lanes, signs (e.g., a stop sign, a yield sign, etc.), traffic lights, obstacles, buildings, sidewalks, pathways, walkways, barriers, etc.

The map module 412 may convert the navigation guideline from a world coordinate representation to a body coordinate representation, and combine the converted body coordinate representation with detected lane boundaries to generate the real-time map. The map module 412 may use various functions, techniques, methods, algorithms, operations, etc., to generate the real-time map.

In other embodiments, the size or distance of the area/location for which the map module 412 may generate the real-time map on the fly may be based on various factors such as the speed of the ADV 101, the distance/time it may take the ADV 101 to slow down or come to a complete stop, etc. For example, if the ADV 101 is travelling at a higher speed/velocity, then the size/distance of the area/location for which the map module 412 may generate the real-time map, may be larger or longer. In another example, if the ADV 101 is travelling at a lower speed/velocity, then the size/distance of the area/location for which the map module 412 may generate the real-time map may be smaller or shorter. In an embodiment, the real-time map can be discarded after the ADV 101 gets off the road segment, thereby relieving the server of the burden of storing map data.

In an embodiment, the real-time map can include multiple navigation guidelines, each corresponding to one of the multiple lanes within a road, which enables the ADV 101 to switch lane while driving on the particular segment of the road. Only lane boundaries of a lane in which the ADV is currently travelling or located are shown on the real-time map. For each of the other one or more other lanes on the segment of the road, only navigation guidelines are shown to further increase the speed of the map generation process and to reduce the size of the real-time map.

In an alternative embodiment, the real-time map only shows a navigation guideline and does not show lane boundaries. This feature is particularly useful when the ADV 101 is travelling a road that does have lane boundaries, and would allow the ADV 101 to travel on any road segment without relying on a high-definition map, as long as manual driving data is available for the ADV 101.

Figure 5:
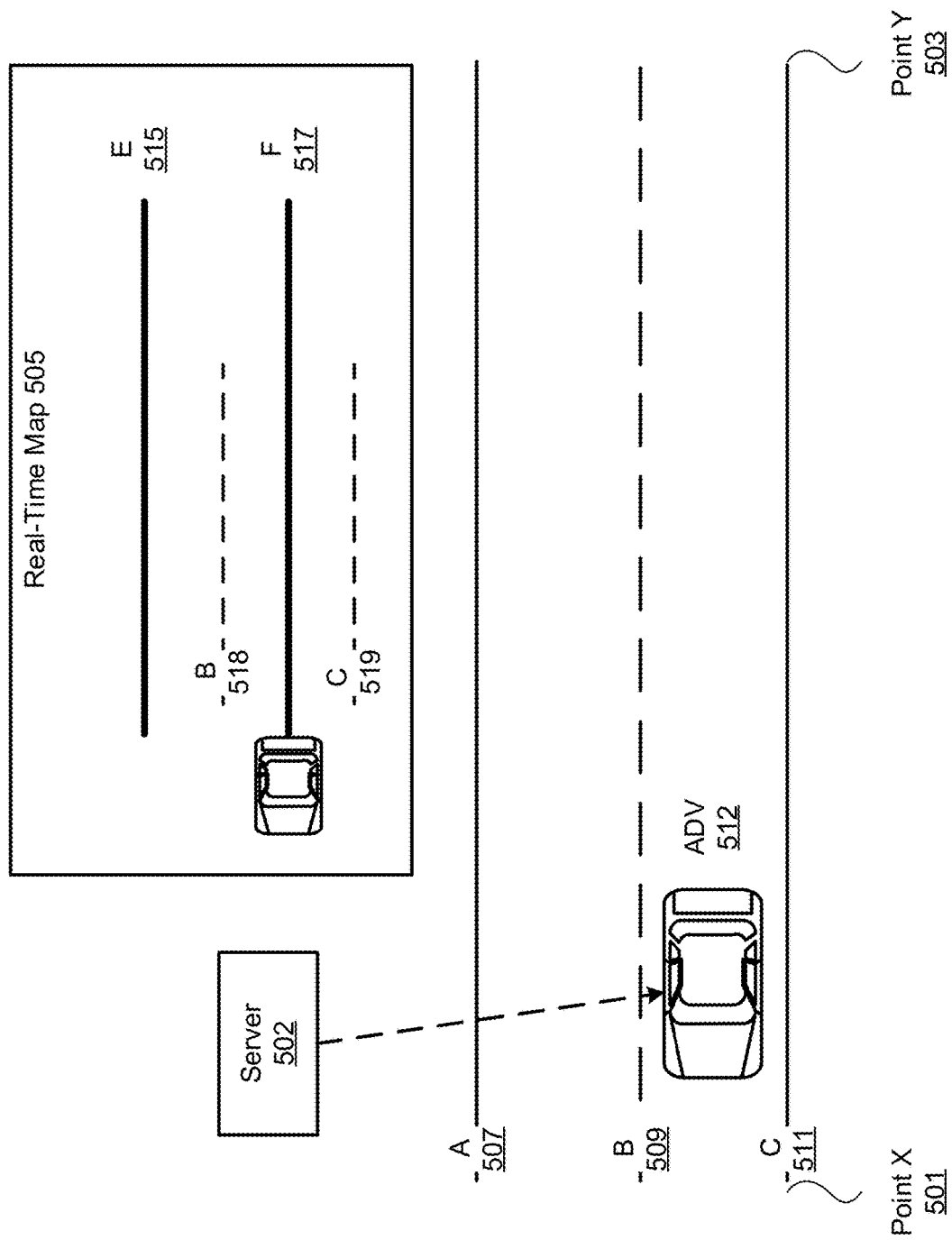
FIG. 5 illustrates an example real-time map in accordance with an embodiment.

FIG. 5 illustrates an example real-time map in accordance with an embodiment. As shown in FIG. 5, server 502 can store manual driving path data collected on a two-lane road segment from point X 501 to point Y 503. The road segment includes lane makers (lane lines) A 507, B 509, and C 511.

The server 502 can generate a navigation guideline for each lane on the road segment. When an ADV 512 gets into the lane between lane boundary B 509 and lane boundary C 511, the ADV 512 can detect that the ADV has entered the lane based on GPS coordinates or other identifiers of the road segment. Upon such detection, the ADV 512 can send a request to the server 502 for navigation guideline information for this road segment, and use the navigation guideline information and detected lane boundaries to create a real-time map 505.

As further shown in FIG. 5, the real-time map 505 can include a navigation guideline E 515 or F 517 for each lane. However, only lane boundaries of the lane within which the ADV 512 is located or travelling are shown. For the lane between lane boundaries A 507 and B 509, the real-time map 505 only shows the navigation guideline E 515, so that the ADV 512 can switch to that lane if the driving environment is such that the ADV 512 needs to switch lane.

When driving in the lane between lane boundary B 509 and lane boundary C 511, the ADV 512 follows the navigation guideline F 517 as a reference line, and stays within the lane boundaries B 518 and C 519.

Figure 6:
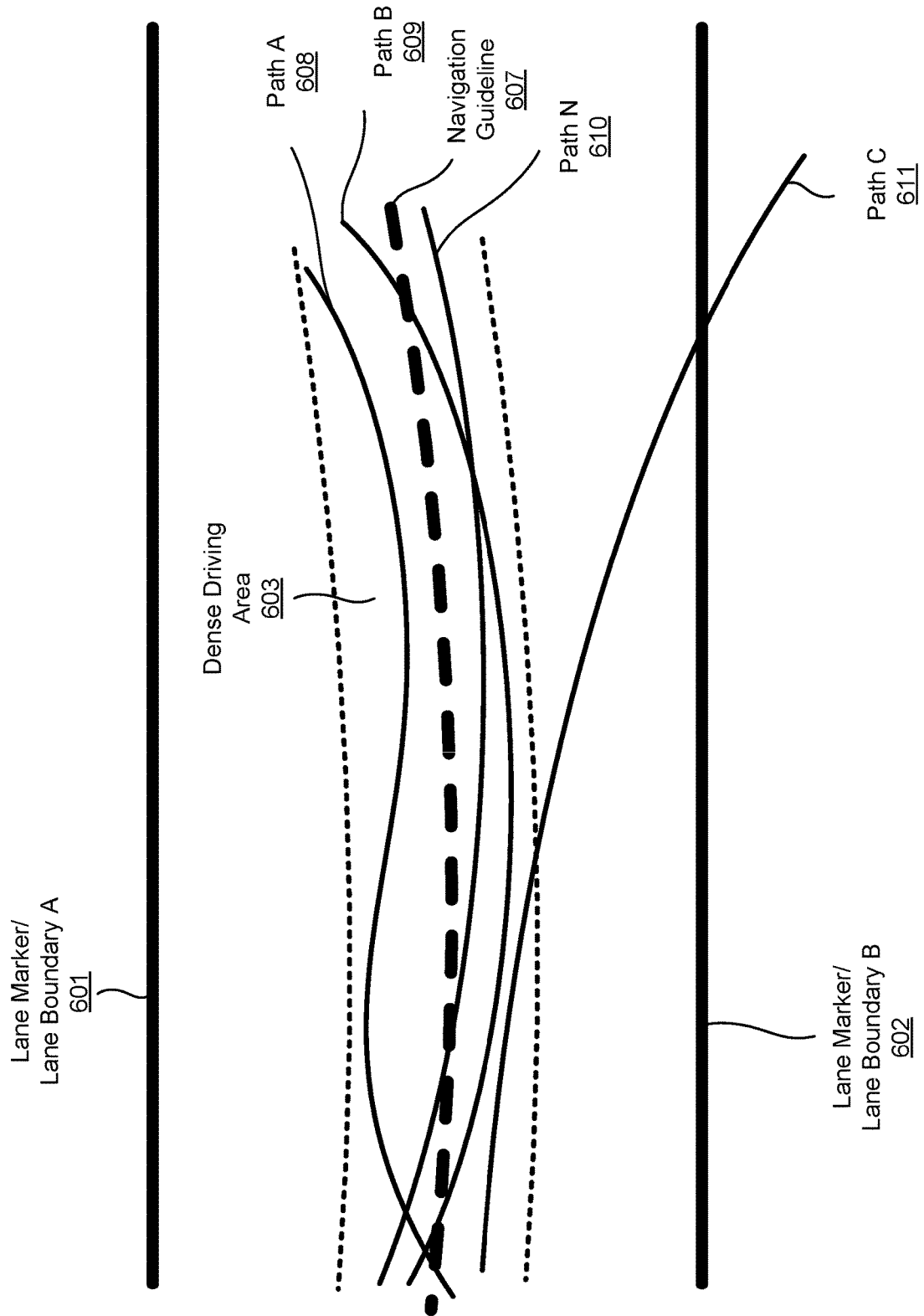
FIG. 6 illustrates a process of generating a navigation guideline from manual driving path data, in accordance with an embodiment.

FIG. 6 illustrates a process of generating a navigation guideline from manual driving path data, in accordance with an embodiment. Referring to FIG. 6, a lane between lane boundaries A 601 and B 602 on a road segment includes a number of manual driving paths/trajectories 608, 609 and 610. The path data can be stored in a server (e.g., server 103 in FIG. 1 or FIG. 502 in FIG. 5).

The server can use an algorithm to generate a navigation guideline from the manual driving path data. In one embodiment, the server can clean the data by removing outliers (e.g., driving path 605) due to aggressive driving behaviors or low quality of locations. The server can then determine dense driving areas (e.g., dense driving area 603) in the lane on the road segment, and apply a smooth algorithm to each dense driving area to generate a smooth path within the dense driving area. The smooth paths for the dense driving areas can be utilized to form a navigation guideline 607 for the lane on the road segment. In an embodiment, the smooth algorithm can be one of the adjacent-averaging method, the Savitzky-Golay method, the percentile filter method, or another smooth algorithm. A guideline for a particular lane or road is then generated based on the smoothed paths, for example, by taking an averaged lateral positions of the path points along the paths at different points in time. The rationale behind this is that most of the vehicles would have driven close to a centerline of a lane. Thus, a majority of the prior driving patterns would represent the centerline of the lane or road, i.e., guideline or reference line of the lane or road.

That is, for a particular point in time, there will be a path point representing a single averaged position of all path points of all trajectories at the same point in time. The selected path points are then connected to form a rough reference line. Since each of the selected path points on the rough reference line is determined based on the averaged positions of the all trajectories (e.g., candidates), the reference line is not smooth and continuous. According to one embodiment, a smoothing operation is performed on the rough reference line. For example, a polynomial function is utilized to fit or optimize the reference line in view of a set of predetermined constraints.

The term of polynomial optimization or polynomial fit refers to the optimization of the shape of a curve (in this example, a trajectory) represented by a polynomial function (e.g., quintic or quartic polynomial functions), such that the curve is continuous along the curve (e.g., a derivative at the joint of two adjacent segments is obtainable). In the field of autonomous driving, the polynomial curve from a starting point to an end point is divided into a number of segments (or pieces), each segment corresponding to a control point (or reference point). Such a segmented polynomial curve is referred to as a piecewise polynomial. When optimizing the piecewise polynomial, a set of joint constraints and a set of boundary constraints between two adjacent segments have to be satisfied, in addition to the set of initial state constraints and end state constraints.

The set of joint constraints includes positions (x, y), speed, heading direction, and acceleration of the adjacent segments have to be identical. For example, the ending position of a first segment (e.g., leading segment) and the starting position of a second segment (e.g., following segment) have to be identical or within a predetermined proximity. The speed, heading direction, and acceleration of the ending position of the first segment and the corresponding speed, heading direction, and acceleration of the starting position of the second segment have to be identical or within a predetermined range. In addition, each control point is associated with a predefined boundary (e.g., 0.2 meters left and right surrounding the control point). The polynomial curve has to go through each control point within its corresponding boundary. When these two set of constraints are satisfied during the optimization, the polynomial curve representing a trajectory should be smooth and continuous.

Figure 7:
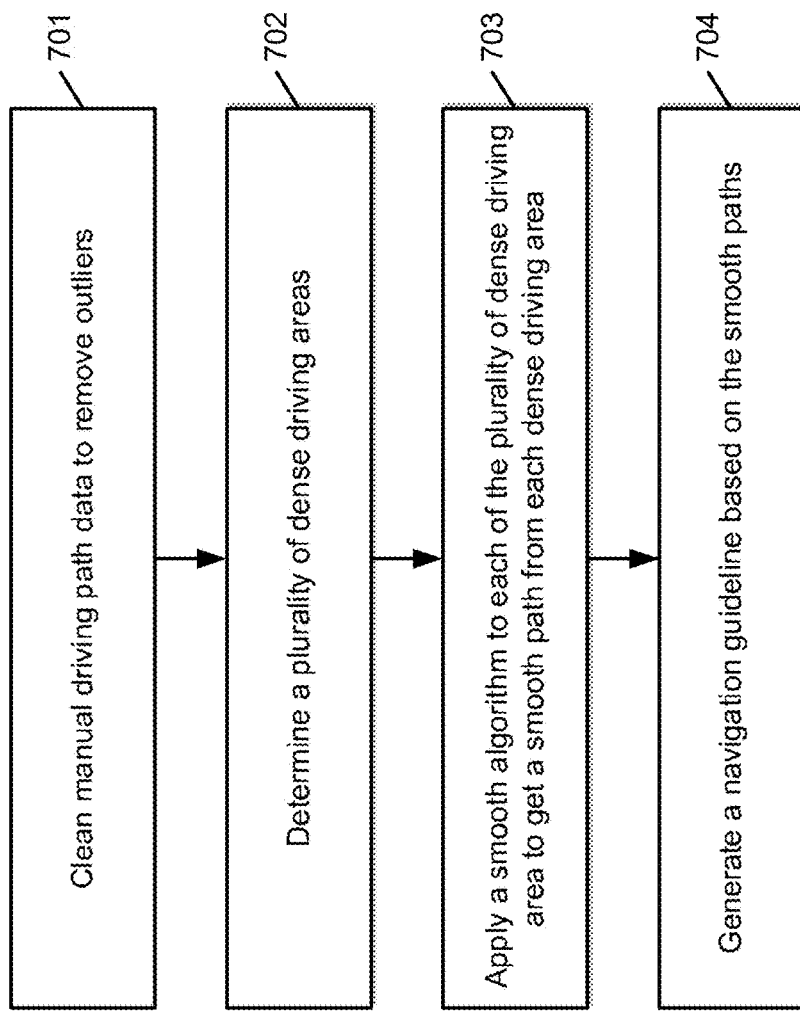
FIG. 7 is a flow diagram illustrating an example process of generating a navigation guideline from manual driving path data, in accordance with an embodiment.

FIG. 7 is a flow diagram illustrating an example process of generating a navigation guideline from manual driving path data, in accordance with an embodiment. Process 700 may be performed by processing logic which may include software, hardware, or a combination thereof. In one embodiment, process 700 may be performed by server 103 in FIG. 1 or FIG. 502 in FIG. 5. As shown in FIG. 7, in operation 711, manual driving path data can be cleaned to remove outliers due to aggressive driving behaviors or low quality of locations. In operation 702, multiple dense driving areas within a lane on a road segment are determined. A dense driving area can be an area in the lane on the road segment that is crossed by a pre-determined number of driving paths (e.g., over 70% of the manual driving paths). In operation 703, a smooth algorithm is applied to each of the dense driving areas to create a number of smooth paths. In operation 704, the smooth paths are utilized to generate a navigation guideline for the lane on the road segment.

Figure 8:
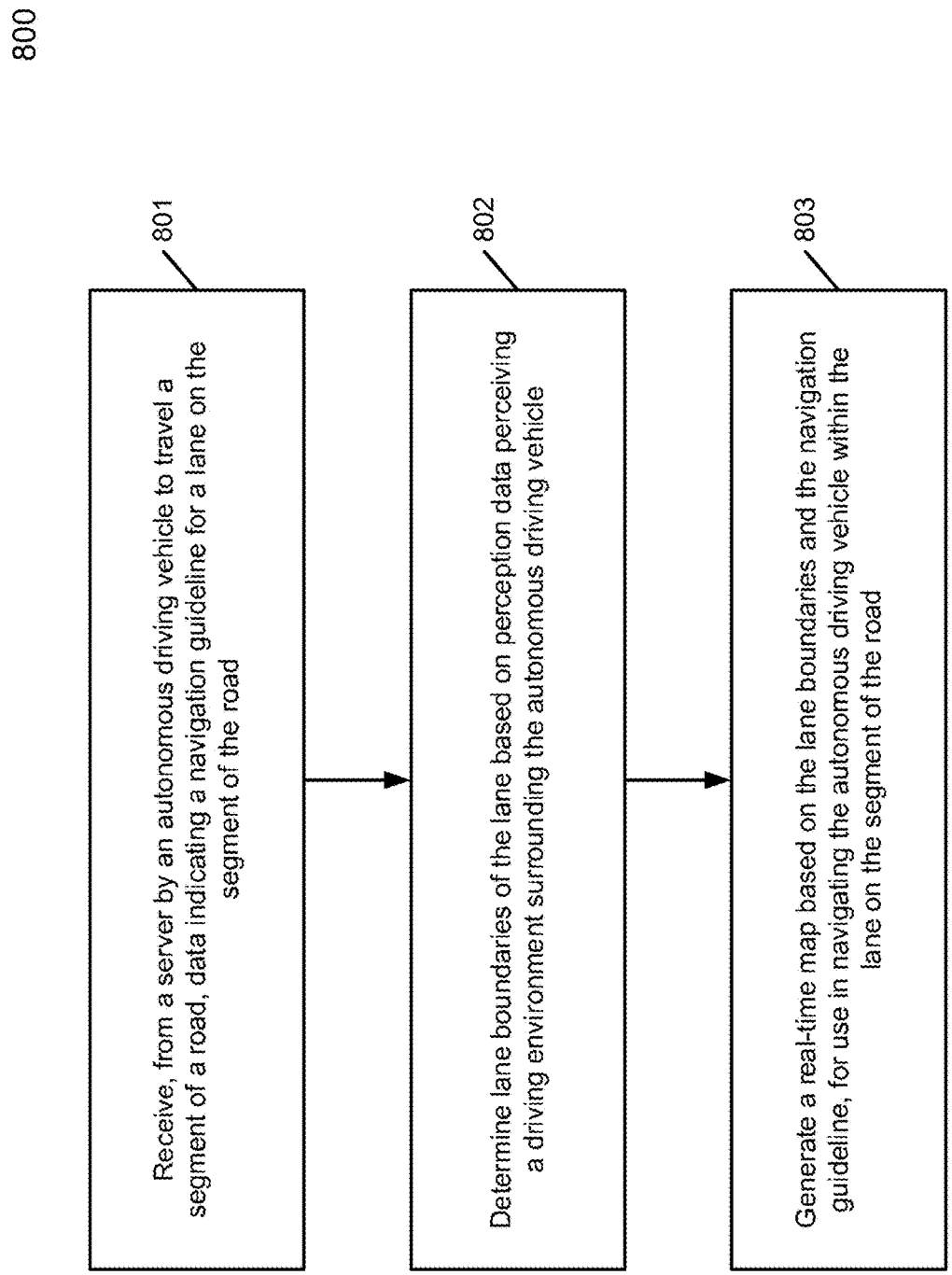
FIG. 8 is a flow diagram illustrating an example of process 800 for generating real-time maps based on manual driving path data according to some embodiments.

FIG. 8 is a flow diagram illustrating an example of process 800 for generating real-time maps based on manual driving path data according to some embodiments.

Process 800 may be performed by processing logic which may include software, hardware, or a combination thereof. Process 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 800 may be performed by one or more of perception module 302 and planning module 305, illustrated in FIG. 3A, FIG. 3B, and FIG. 4A.

Referring to FIG. 8, in operation 801, processing logic in an autonomous driving vehicle obtains from a server data indicating a navigation guideline for a lane on the segment of the road. The navigation guideline is derived from manual driving path data collected by a manned vehicle that has travelled the road segment a number of times. A smooth algorithm can be used to each dense driving area in the lane on the road segment to get a smooth path. Each smooth path can be connected to formulate a navigation guideline for the lane. On the road segment with multiple lanes, each lane can have its own navigation guideline. In operation 803, processing logic can obtain detected lane boundaries of the lane. The detected lane boundaries can be limited to a pre-determined length. For example, only data for 10 meters of the lane boundaries in front of or behind the ADV is used. In operation 805, processing logic generates a real-time map based on the lane boundaries and the navigation guideline, for use in navigating the autonomous driving vehicle within the lane on the road segment. The autonomous driving vehicle, when travelling in the lane on the road segment, uses the navigation guideline for the lane as a reference line, and uses the lane boundaries for the lane as boundaries.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
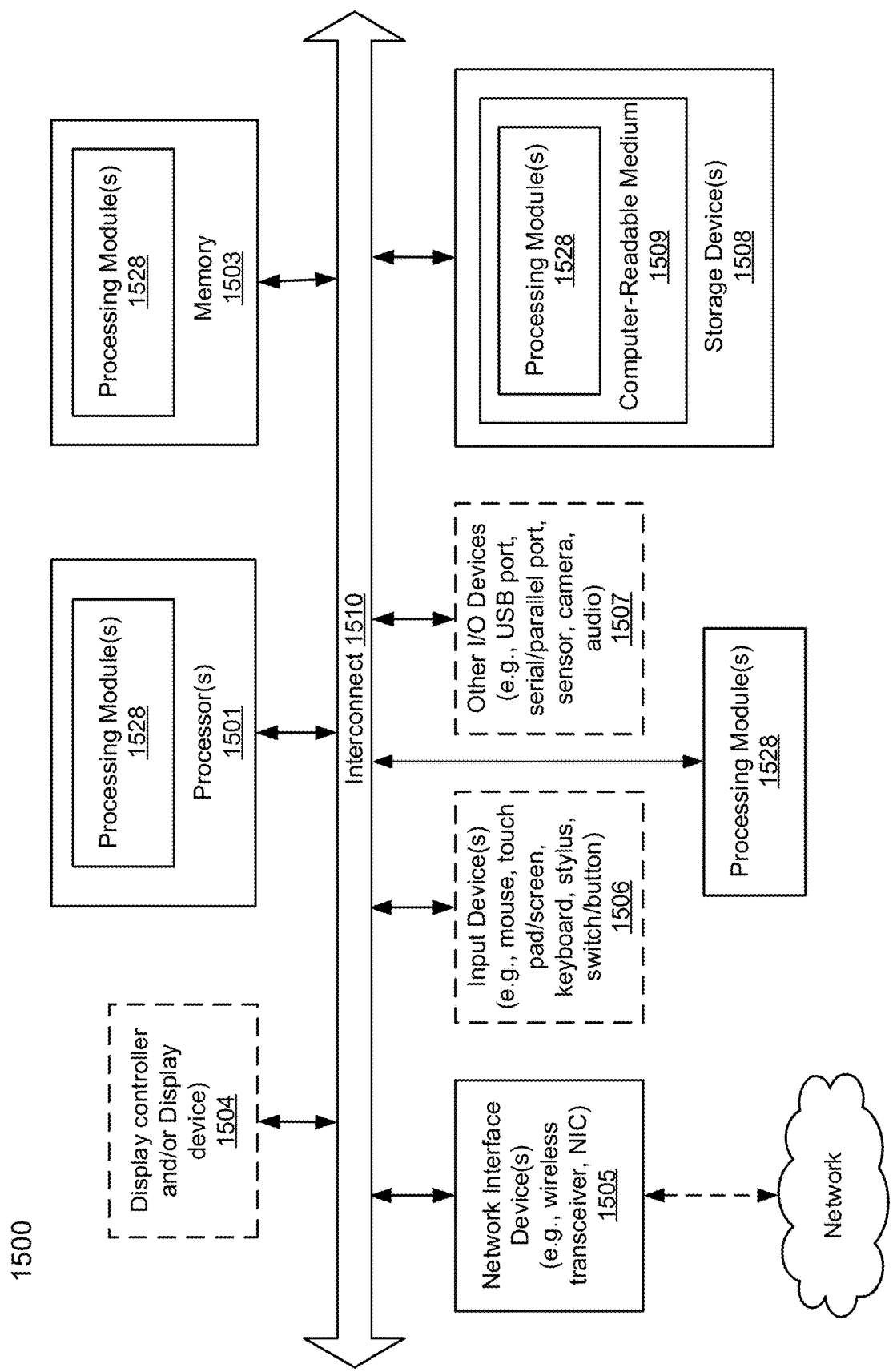
FIG. 9 is a block diagram illustrating an example of a data processing system which may be used with one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, routing module 307, and real-time map generation module 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for dynamically generating a real-time map for use by an autonomous driving vehicle, the method comprising:
   receiving, from a server by the autonomous driving vehicle to travel on a segment of a road, data indicating a reference line for a lane on the segment of the road, wherein the reference line is a center line of the lane, and is derived from prior driving path data collected by a plurality of vehicles that travelled in the lane on the segment of the road;
   determining lane boundaries of the lane based on perception data, wherein the perception data is collected in real time by the autonomous driving vehicle;
   generating the real-time map based on the lane boundaries and the reference line, wherein the real-time map covers a size of the segment of the road determined based on a speed of the autonomous driving vehicle;

generating a path and a plurality of driving parameters based on the reference line in the real time map and objects perceived by the autonomous driving vehicle; and controlling, by a processor, the autonomous driving vehicle on the segment of the road using control commands generated from the plurality of driving parameters.

2. The method of claim 1, wherein the reference line is positioned in a global coordinate system, and is converted into relative coordinates relative to a location of the autonomous driving vehicle prior to generating the real-time map.

3. The method of claim 1, wherein the autonomous driving vehicle follows the reference line and uses the lane boundaries as boundaries when travelling within the lane on the road segment.

4. The method of claim 1, wherein the real-time map is updated according to a planning cycle of the autonomous driving vehicle in planning driving parameters for the autonomous driving vehicle.

5. The method of claim 1, wherein the prior driving path data is stored in the server, which operates to generate a reference line for each lane on the road segment by applying a smooth algorithm to each of a plurality of dense driving areas to find a smooth path, and connecting the smooth path for each dense driving area.

6. The method of claim 1, wherein the real-time map is a relative map specific to the autonomous driving vehicle, and is discarded after the autonomous driving vehicle completes traveling the segment of the road.

7. The method of claim 1, wherein the generated real-time map includes one or more additional reference lines that the autonomous driving vehicle is to use in traveling the segment of the road.

8. A non-transitory machine-readable medium having instructions stored therein for dynamically generating a real-time map for use by an autonomous driving vehicle, which when executed by a processor, cause the processor to perform operations, the operations comprising:

receiving, from a server by the autonomous driving vehicle to travel on a segment of a road, data indicating a reference line for a lane on the segment of the road, wherein the reference line is a center line of the lane, and is derived from prior driving path data collected by a plurality of vehicles that travelled in the lane on the segment of the road;

determining lane boundaries of the lane based on perception data, wherein the perception data is collected in real time by the autonomous driving vehicle;

generating the real-time map based on the lane boundaries and the reference line, wherein the real-time map covers a size of the segment of the road determined based on a speed of the autonomous driving vehicle;

generating a path and a plurality of driving parameters based on the reference line in the real time map and objects perceived by the autonomous driving vehicle; and controlling the autonomous driving vehicle on the segment of the road using control commands generated from the plurality of driving parameters.

9. The non-transitory machine-readable medium of claim 8, wherein the reference line is positioned in a global coordinate system, and is converted into relative coordinates relative to a location of the autonomous driving vehicle prior to generating the real-time map.

10. The non-transitory machine-readable medium of claim 8, wherein the autonomous driving vehicle follows the reference line and uses the lane boundaries as boundaries when travelling within the lane on the road segment.

11. The non-transitory machine-readable medium of claim 8, wherein the real-time map is updated according to a planning cycle of the autonomous driving vehicle in planning driving parameters for the autonomous driving vehicle.

12. The non-transitory machine-readable medium of claim 8, wherein the prior driving path data is stored in the server, which operates to generate a reference line for each lane on the road segment by applying a smooth algorithm to each of a plurality of dense driving areas to find a smooth path, and connecting the smooth path for each dense driving area.

13. The non-transitory machine-readable medium of claim 8, wherein the real-time map is a relative map specific to the autonomous driving vehicle, and is discarded after the autonomous driving vehicle completes traveling the segment of the road.

14. The non-transitory machine-readable medium of claim 8, wherein the generated real-time map includes one or more additional reference lines that the autonomous driving vehicle is to use in traveling the segment of the road.

15. A data processing system, comprising:

a processor; and a memory coupled to the processor to store instructions for dynamically generating a real-time map for use by an autonomous driving vehicle, which instructions when executed by the processor, cause the processor to perform operations, the operations comprising:

receiving, from a server by the autonomous driving vehicle to travel on a segment of a road, data indicating a reference line for a lane on the segment of the road, wherein the reference line is a center line of the lane, and is derived from prior driving path data collected by a plurality of vehicles that travelled in the lane on the segment of the road;

determining lane boundaries of the lane based on perception data, wherein the perception data is collected in real time by the autonomous driving vehicle;

generating the real-time map based on the lane boundaries and the reference line, wherein the real-time map covers a distance of the segment of the road determined based on a speed of the autonomous driving vehicle;

generating a path and a plurality of driving parameters based on the reference line in the real time map and objects perceived by the autonomous driving vehicle; and controlling the autonomous driving vehicle on the segment of the road using control commands generated from the plurality of driving parameters.

16. The system of claim 15, wherein the reference line is positioned in a global coordinate system, and is converted into relative coordinates relative to a location of the autonomous driving vehicle prior to generating the real-time map.

17. The system of claim 15, wherein the autonomous driving vehicle follows the reference line and uses the lane boundaries as boundaries when travelling within the lane on the road segment.

18. The system of claim 15, wherein the real-time map is updated according to a planning cycle of the autonomous driving vehicle in planning driving parameters for the autonomous driving vehicle.

19. The system of claim 15, wherein the prior driving path data is stored in the server, which operates to generate a reference line for each lane on the road segment by applying a smooth algorithm to each of a plurality of dense driving areas to find a smooth path, and connecting the smooth path for each dense driving area.

20. The system of claim 15, wherein the real-time map is a relative map specific to the autonomous driving vehicle, and is discarded after the autonomous driving vehicle completes traveling the segment of the road.

* * * * *